(12) United States Patent
Stickle et al.

(10) Patent No.: US 9,947,033 B1
(45) Date of Patent: Apr. 17, 2018

(54) STREAMING DATA MARKETPLACE

(71) Applicant: Amazon Technologies, Inc., Seattle, WA (US)

(72) Inventors: Thomas Charles Stickle, Saint James, NY (US); Dorothy Copeland, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 629 days.

(21) Appl. No.: 14/500,866

(22) Filed: Sep. 29, 2014

(51) Int. Cl.
*G06Q 30/00* (2012.01)
*G06Q 30/06* (2012.01)
*H04L 29/06* (2006.01)

(52) U.S. Cl.
CPC ......... *G06Q 30/0601* (2013.01); *H04L 65/60* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| 2007/0094493 | A1* | 4/2007 | Ali | G06F 21/34 |
| | | | | 713/156 |
| 2014/0172625 | A1* | 6/2014 | Reisman | G06Q 30/02 |
| | | | | 705/26.7 |
| 2014/0337160 | A1* | 11/2014 | Jin | G06Q 50/01 |
| | | | | 705/26.7 |

OTHER PUBLICATIONS

"All Communications Combines Streaming Video and Multi-Point Videoconferencing Service for Data General" (PR Newswire, Jun. 2, 1999: 1359) https://dialog.proquest.com/professional/docview/667412188?accountid=142257.*

* cited by examiner

*Primary Examiner* — Ethan D Civan
(74) *Attorney, Agent, or Firm* — Thorpe North & Western, LLP

(57) ABSTRACT

A technology for a streaming data marketplace is provided. In one example, a method may include requesting to receive a first stream of data from a first source via the streaming data marketplace. The first stream of data may be received and then correlated and combined with data from a second source as a combined stream. The combined stream may then be published to the streaming data marketplace.

19 Claims, 9 Drawing Sheets

STREAMING DATA MARKETPLACE

BACKGROUND

With the accelerating adoption of networked service provider environments (e.g., "cloud" computing) around the world, organizations are increasingly seeking ways to manage large amounts of data and large-scale computing resources. Services have been developed for real-time processing of streaming data at massive scales. For example, a streaming analytics service may collect and process hundreds of terabytes of data per hour from hundreds of thousands of sources. Such a service enables developers to write applications that process information in real-time from sources such as web site click-streams, marketing and financial information, manufacturing instrumentation and social media, operational logs, metering data and so forth.

Additionally, a streaming analytics service may enable developers to build real-time dashboards, capture exceptions and generate alerts, drive recommendations, and make other real-time business or operational decisions. Applications can be built which respond to changes in the streaming data in seconds, at any scale. Stream data may be stored across multiple availability zones in a region for a set time window. During that window, data is available to be read, re-read, backfilled, analyzed or moved to long-term storage. Developers can focus on creating business applications while offloading the burden associated with load-balancing streaming data, coordinating distributed services, and fault-tolerant data processing. Despite the benefits of a streaming analytics service, improvements may yet be made to improve the value and availability of streaming analytics data.

DETAILED DESCRIPTION

A technology for a streaming data marketplace is provided. Individuals, companies or organizations may provide streaming data to the streaming data marketplace as streams, and customers may subscribe to receive the streaming data. In one example, a first stream of data may be received from a first source by a customer via the streaming data marketplace. The first stream of data may then be correlated and combined with data from a second source by the customer, who received the first stream, to form a combined stream, where the second source of data may be a second stream of data or may be persistent data. The customer may specify how to combine or correlate the data and use processing controlled by the customer to combine or correlate the data. The customer may then publish the combined stream to the streaming data marketplace and make the combined stream available to other customers for consumption, further combination/correlation or other options.

In accordance with another example, a method for operating a streaming data marketplace is provided. The method may include receiving requests at the streaming data marketplace to sell streaming data from streaming data sellers. Browsing and purchasing options may be provided for display to a customer of the streaming data to browse and purchase streaming data from one or more of the streaming data sellers. The customer may purchase the streaming data by amount, such as by the megabyte or gigabyte for example, rather than purchasing the data for an amount of time (e.g., an hour, day, week, etc.). In other words, the amount of data may be purchased independently of a time within which the amount of the streaming data is received. The streaming data may be streamed to the customer in the amount purchased.

Figure 1:
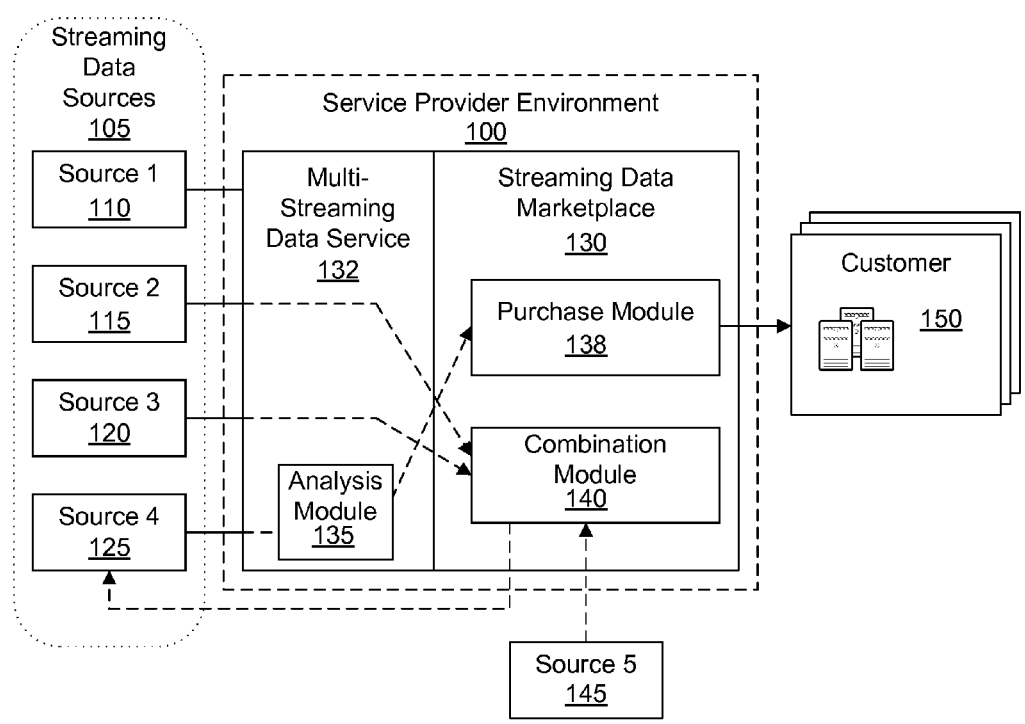
FIG. 1 is a block diagram of a streaming data marketplace for correlating and combining multiple data streams for sale to customers in accordance with an example of the present technology.

FIG. 1 illustrates an example implementation of a streaming data marketplace 130. The streaming data marketplace 130 may include or be in connection with a fully managed multi-streaming data service 132 for real-time processing of streaming data at a massive scale using an analysis module 135. The multi-streaming data service 132 may be able to collect and process hundreds of terabytes of data per hour from thousands of sources, allowing developers to write applications that process information in real-time or near real time with relatively low latency, from sources such as web site click-streams, marketing and financial information, manufacturing instrumentation and social media, operational logs, metering data and so forth. FIG. 1 illustrates a plurality of streaming data sources 105, source 1-4 110, 115, 120, 125, as inputs to the streaming data marketplace 130. The multi-streaming data service 132 includes an analysis module 135 to process the incoming data streams and may provide this processed information for purchase or subscription through a purchase module 138 to a customer 150 through real-time dashboards, alerts, recommendations and so forth. Based on the analyzed data, developers can build applications which respond to changes in a data stream in seconds or even less time, at any scale, while paying for the resources actually used.

Streaming analytics technologies hold the promise of making vast volumes of data available in a low latency fashion. However, while prior technologies may be able to provide data in a low latency fashion, the raw data may have low value (or have less valuable than the data could have) until the raw data is enhanced by correlating the raw data with additional data, such as by matching records using common values. In some examples, the useful additional data to correlate with the data stream may not exist in one place but rather may be held by many entities or owners. As the data from each of these entities is correlated and combined with the raw data, the data stream may become more valuable. One example is a data stream that publishes or includes global bitcoin transactions (or any crypto currency transaction). These transactions are completely visible to each participant in the network. The raw transaction data may have little meaning to a customer unless the customer has a way to correlate various elements of the stream with other useful data. For example, a group of electronic or internet retailers who accept bitcoin transactions may have a shipping address that may correlate with the bitcoin address. The electronic retailers may combine the shipping address with the bitcoin transaction data to create correlated data and republish the combined data as a combined data stream. A group of telecommunications providers may subscribe downstream to the combined data stream and be able to correlate the IP (Internet Protocol) addresses of the transactions to countries of origin. Government agencies may be able to subscribe downstream and correlate tax transaction data to help identify transaction participants.

FIG. 1 illustrates that the streaming data marketplace 130 further includes a combination module 140. The combination module 140 may be used to combine data from a data source (e.g., source 5 145) with one or more of the streaming data sources 105 available through the streaming data marketplace 130. The combination module 140 may be used to correlate the streaming data and the other data and to combine and republish the combined data stream. At least one of the data sources combined to create the combined data stream may be one of the streaming data sources 105. Another of the data sources may be one of the streaming data sources 105 or may be a different source that may not be available for streaming through the streaming data marketplace, such as source 5 145. For example, the data source may be a static or persistent data source (e.g., data that is typically not modified), such as a database of customer addresses.

As used herein, a "data stream" or "streaming data" may refer to a sequence of digitally encoded coherent data parcels provided over time (e.g., packets of data or data packets) that are used to transmit or receive information. Streaming data may refer to data with a substantially constant flow. The streaming data may be in contrast to batch data, persistent data or static data because streaming data may be substantially continuously updated or modified with new data. Also, whereas persistent data may often be stored for even long periods of time (e.g., weeks, months or years), streaming data often is less valuable after such long periods of time and is thus often stored for shorter, more transient periods of time (e.g., seconds, minutes or hours).

The present technology may provide the streaming data marketplace 130 in a service provider environment 100 as a service for organizing, enabling, creating and marketing streaming analytics chains with multiple vendor relationships. For example, at a top level in the chain, a data publisher may publish a raw data stream. The streaming data marketplace 130 enables the publisher to define a policy describing how customers can consume the raw data stream or how the customers may add themselves to the streaming data and republish the modified data to form a chain. For example, the publisher may set a policy whereby potential chain members request access to join the chain as resellers or streaming data sources 105. When a customer registers with the streaming data marketplace 130 the customer 150 may apply to join the analytics chain as a reseller. The customer may propose a reseller price that the owner of the chain may approve or reject. Once granted permission, the customer 150 may add a consumer process as a combination module 140 that will enhance the data from the analysis module, such as through correlation or combination with other data, and the customer 150 may republish the data as a combined data stream. Subsequent customers may attempt to join at any point in the chain or may request to consume data from any point in the chain. Subsequent customers may optionally obtain permission from one or each upstream participant to obtain access as a reseller and to validate the resale price.

For customers that wish to consume data, the customers may subscribe to the desired data stream and may optionally select desired enhancements that are not already included in the desired data stream. The desired enhancements may be correlative data from one or more additional sources that may be correlated to and combined with the data of the desired data stream. For example, a law enforcement agency may be a customer and may desire to receive global bitcoin transactions, correlated by country, with ISP data to determine source IP addresses and shipping addresses that correlate to bitcoin addresses. The agency may not want additional available enhancements such as local bank data records. The streaming data marketplace may price this desired data out per GB (gigabyte), for example, and the agency can start running analytics on the desired data using the analysis module.

FIG. 1 illustrates an example where the combination module 140 correlates and/or combines data from streaming data sources 105, such as sources 2-3 115, 120, and from a persistent data store, source 5 145, and republishes the combined data as a combined data stream, source 4 125. The analysis module 135 may optionally perform analytics operations on the combined data stream, source 4 125, to identify trends or other useful information. In this example, sources 2-3 115, 120 may optionally be analyzed before combination with one another and with source 5 145 or may be combined and then analyzed. When sources 2-3 115, 120 are analyzed before combination, the data of sources 2-3 115, 120 used in the combination may actually be derivative data streams of data derived from sources 2-3 115, 120 rather than the raw data from sources 2-3 115, 120. In some examples, rather than simply publishing the combined data resulting from the combination of data from sources 2-3 115, 120 and 5 145, the customer may perform analytics on the combined data stream, source 4 125, to obtain a derivative of source 4 125 and publish the derivative stream to the streaming data marketplace 130 for consumption by other customers.

The customer 150 may use the combined data stream, source 4 125, for the customer's own purposes or may make the combined data stream available for consumption by other customers, either publicly or with restricted access. The combined data stream may be made available for consumption by other customers for a fee, such as for the amount of data (e.g., per GB) consumed. A portion of the fee may be paid to the original publishers of sources 2-3 115, 120, and a portion of the fee may be paid to the customer 150 that correlated and combined the data. Further, a portion of the fee may be paid to the streaming data marketplace 130.

Figure 2:
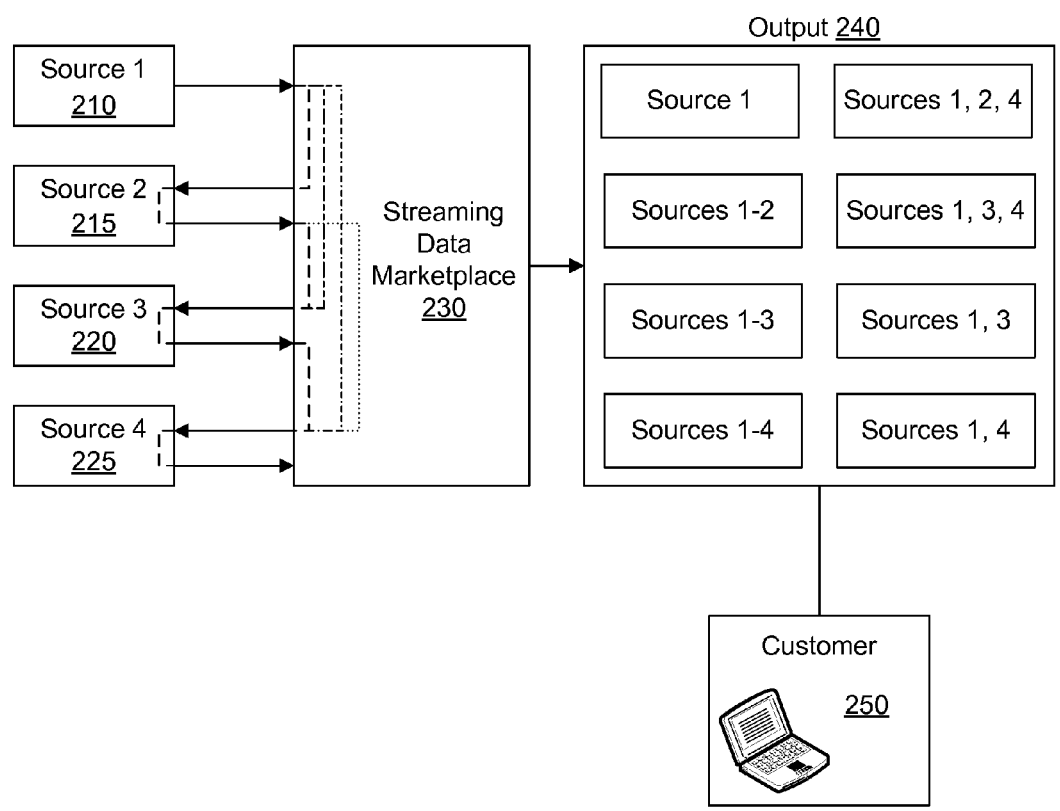
FIG. 2 is a block diagram of a streaming data marketplace system, illustrating example output stream combinations in accordance with an example of the present technology.

Referring to FIG. 2, another example streaming data marketplace is illustrated which is similar in some regards to the example illustrated in FIG. 1. FIG. 2 illustrates some example combinations of data sources, sources 1-4 210, 215, 220, 225, that may be available to a customer 250. In some examples, multiple data sources may be linked together in a chain, each cumulatively adding to or building upon data from a previous link. For example, source 1 210 may be a streaming data source. Sources 2-4 215, 220, 225 may or may not be streaming data sources. For example, sources 2-4 215, 220, 225 may be streaming data sources or may be other persistent/static or dynamic, non-streaming data useful to enhance the data of source 1 210. An example data chain may include the combination of data from source 1 210 with data from source 2 215, the combination of data from combined sources 1-2 210, 215 with data from source 3 220, and the combination of data from combined sources 1-3 210, 215, 220 with data from source 4 225. Sources 2-4 215, 220, 225 may be additive data for enhancing the data of source 1 210 but with limited value otherwise. Thus, sources 2-4 215, 220, 225 may be dependent upon source 1 210. One or more of sources 2-4 215, 220, 225 may also be dependent upon another of sources 2-4 215, 220, 225. For example, data from source 4 225 may include the data of sources 1-3 210, 215, 220 to be useful but may have limited value if any one of sources 1-3 210, 215, 220 were excluded from the chain. Similarly, data from any one of sources 1-3 210, 215, 220 may have limited value without the enhancements of the data from source 4 225. In this example, a customer 250 may subscribe to the chain by subscribing to source 4 225 and receive the data and enhancements from each of sources 1-4, 210, 215, 220, 225.

In other examples, sources 2-4 215, 220, 225 may be dependent upon source 1 210 and independent of one another. As a result, output 240 from the streaming data marketplace available to the customer as a data stream may include: the data from source 1; data from sources 1-2; data from sources 1-3; data from sources 1-4; data from sources 1, 2 and 4; data from sources 1, 3 and 4; data from sources 1 and 3; and data from sources 1 and 4. Each of sources 2-4 may thus represent optional enhancements to data from source 1 to which a customer may select whether to subscribe. A customer may pay for a subscription and/or a defined amount of data from any one of the outputs 240 illustrated here.

FIG. 2 illustrates a simple example of how data sources may be combined or made available as output 240 through a streaming data marketplace. More complex implementations are also contemplated. For example, any number of streaming data sources may be available as independent sources, with any number of independent or dependent sources available in a chain, mesh or other connected structure, and may combine in any manner desired by or useful to customers.

Figure 3:
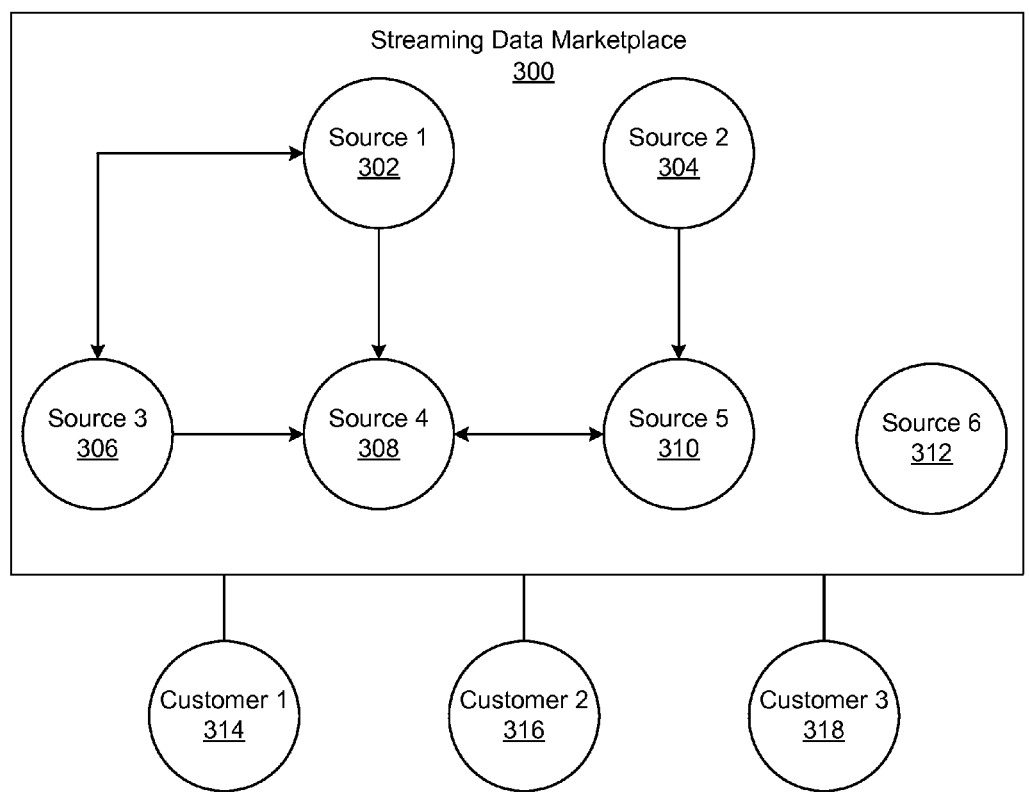
FIG. 3 is a block diagram of a streaming data marketplace, illustrating relationships and links between data sources in accordance with an example of the present technology.

FIG. 3 illustrates another example streaming data marketplace showing potential relationships between streaming data providers. In this example, sources 1, 2, 3 and 6 302, 304, 306, 312 may be independent sources or original sources, while sources 1 and 3 302, 306 may optionally be dependent on one another. Sources 4 and 5 308, 310 may be dependent or additive data sources. In FIG. 3, source 6 312 is not combined with any other data. Source 2 304 is combined with source 5 310 and is optionally further combined with source 4 308. Source 1 302 may be combined with one or more of sources 3-5 306, 308, 310. Source 3 306 may be combined with one or more of sources 1, 4 and 5 302, 308, 310. A customer 314, 316, 318 may thus be presented with options to subscribe to desired data. Some independent sources may be available directly without combination with other data, such as sources 3 and 6 306 312, while other independent sources may be available solely in combination with some other data, such as sources 1 and 2 302, 304.

In some examples, a customer 314, 316, 318 may desire raw data from a particular source that is currently unavailable in the streaming data marketplace, such as from source 2 304. The system may optionally enable the customer 314, 316, 318 to request the raw data from source 2 304 from the publisher of source 2 304. In this example, the customer 314, 316, 318 may optionally modify the data through the correlation with data from source 5 310 and optionally further with data from source 4 308. In a further example, the customer 314, 316, 318 may wish to combine data from sources 1 and 2 302, 304, but such a chain is not present in the system. The customer 314, 316, 318 could, for example, subscribe to data from combined sources 2 and 5 304, 310 and also to data from combined sources 1 and 4 302, 308, perform the correlation, and optionally republish the data for analysis and/or resale. In another example, the system may enable customers 314, 316, 318 to subscribe to any of the various data streams individually, when an individual subscription is made available by the publisher, and may perform correlations and combinations of data as desired.

The streaming data marketplace may enable various different publishers to publish data that may be correlated to provide a better picture of what is happening in the financial industry, for example, to customers. Using the financial services sector as an example, an investment bank may be sending trades throughout the data. A market infrastructure may be clearing the trades. A commercial bank may be taking wholesale payment for the trades. Each of these entities may have some data related to the transaction or about the customer that could be useful to one another or to other entities when considered in combination. Such data is typically not available to other entities due to a lack of resources to manage or process the data, or to enhance the data to increase the utility. The present technology enables utility and sharing of this data, and in such a way that the publishers of the data may be financially rewarded for sharing the data.

The streaming data may be received, modified and republished stream in near real time, with minimal latency, such as with latency of less than a minute, less than thirty seconds, less than ten seconds, less the five seconds, less than two seconds or less than one second. The streaming data marketplace may enable continuous and simultaneous receipt, modification and/or republication of data streams.

The multi-streaming data service may collect the high throughput volumes of data generated by applications, infrastructure operations, and mobile devices, and make the data available for fast identification of exceptions, slow queries, page views, click-through paths, or resource utilization. The multi-streaming data service may enable applications which can continuously analyze data at any volume and throughput with low latency. These applications can perform actions on data in windows of time, such as customer behavior over the last five minutes. The multi-streaming data service may enable the capture and processing of the wealth of information flowing through social media to identify changing trends, evaluate social graph dynamics, and to provide analytics on sentiment and sharing behavior. The multi-streaming data service may enable the collection and analysis of financial information minute by minute, at any scale, instead of having to wait until the end of the business day or later, which can enable a quick response to anything from a new trade to changes in value at risk. The multi-streaming data service and streaming data marketplace may enable developers to understand how game players are interacting with games and with each other, and dynamically deliver a more engaging experience. By capturing data such as purchase orders, click-streams, and social media trends, applications can dynamically adjust machine learning-based recommendation and ranking algorithms. Any number of other potential use cases may also be available and are considered to be within the scope of this disclosure.

Figure 4:
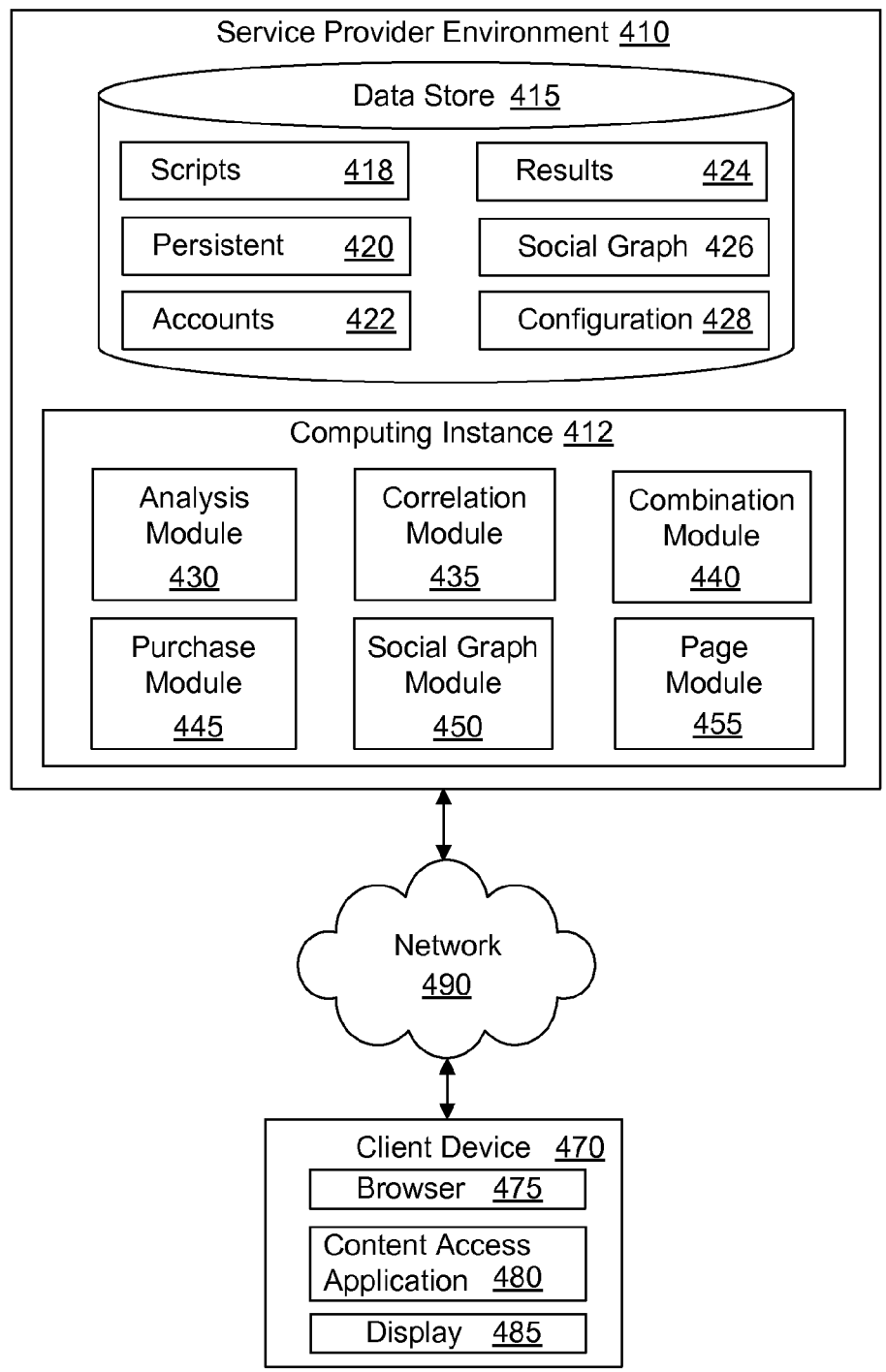
FIG. 4 is a block diagram of a computing system in a service provider environment for implementing a streaming data marketplace in accordance with an example of the present technology.

Reference will now be made to FIG. 4. FIG. 4 illustrates a system for implementing a streaming data marketplace in a service provider environment 410 in accordance with an example of the present technology.

The service provider environment 410 may be a multitenant service provider environment, such as a "cloud" environment for example. The service provider environment 410 may include an execution environment for performing analysis of data streams in real time. The service provider environment 410 may further include an execution environment or a computing instance 412 that includes an application software stack for the customer's program or applications together with one or more infrastructure services for executing the customer's program on the compute service. The customer may use a program having scripts, rules, engines or other components functional to perform correlations of the streaming data with other data, to combine the correlated data in a meaningful way, and republish the combined data to the streaming data marketplace in the service provider environment.

The computing instance 412 in the service provider environment 410 may include a customer-selectable operating system (e.g., Linux, Windows, etc.), application server (e.g., Apache Tomcat), system or application configuration, etc. The service provider environment 410 can be configured to be accessed at specific URLs. The infrastructure services can include, but are not limited to, a load balancer to distribute workload across the requested computing services, a load scaler to scale computing services in response to load or demand variations, a firewall or other service to control access to the computing services, a monitoring interface that permits the customer to monitor execution of applications, data storage resources (e.g., scalable volume block storage), and so forth. In some embodiments, the customer may be able to select one or more services that may be accessed in the service provider infrastructure. For example, the customer may be able to select from a plurality of database models (e.g., a relational database, SQL database, NoSQL database, Oracle database, etc.). In some embodiments, the services can be customized to the customer rather than being a shared resource among a plurality of customers. For example, in some such embodiments, the load balancer can be individually customized to the customer's application rather than being shared or distributed among a number of customers of the computing service provider.

The service provider environment 410 may be capable of delivery of computing and storage capacity, as well as other computing services, as a service to a community of end recipients. In an example implementation, the service provider environment 110 may enable customers to perform desired operations on data received from the streaming data marketplace, to store raw data, analytics, scripts, etc., and otherwise to provide resources for the customer to benefit from the streaming data marketplace.

In one example, a service provider environment 410 may include any number of server computers for a compute service (e.g., compute instance 412). The server computers may provide computing services for executing software or computing instances, which may also be referred to as virtual machines. A virtual machine may generally be an instance of a software implementation of a machine (i.e. a computer) that executes computer code like a physical machine.

Software on the computing instance 412 may be an application or a computer program, such as may be designed to perform an activity, such as analyzing data, correlating data, combining data, publishing data, providing alerts to data and so forth. User-written software applications tailor systems to meet a user's specific needs. User-written software may include custom numerical processing, internet services, database servers, scientific simulations, graphics rendering and animation processes, email filters and so forth. Applications executable on the computing instance and in the service provider environment may be any suitable type or form or application as may be appreciated.

As used herein "virtual computing" may refer to the use of computing services (hardware and/or software) which may be available at a remote location from the customers of the computing services and the virtual computing services may be accessible over a network 490, such as the Internet. Customers may be able to buy these computing services (including storage, computing power, networking and applications) as a utility on demand and sometimes by the hour. Use of virtual computing services can provide a number of advantages including cost advantages and/or the ability to adapt rapidly to changing computing service needs.

The streaming data marketplace may enable collection and analysis of information with low latency (e.g., real-time), providing information from inventory levels to stock trade frequencies and so forth, rather than having to wait for an out-of-date report. The service provider environment 410 enables customers at a client device 470 to create a new stream, set the throughput definitions, and start streaming data quickly and easily to customers. The service provider environment 410 may automatically provision and manage the storage to reliably and durably collect the data stream. The streaming data marketplace may seamlessly scale to match the data throughput rate and volume of data, from megabytes to terabytes per hour and may scale up or down based on demand. Data may be reliably collected, processed, and transformed in real-time before delivery to a data store, where it may be used by existing or new applications.

The system may include any number of modules useful for enabling or providing the streaming data marketplace in the service provider environment 410. For example, the system may include an analysis module 430 to analyze streaming data in real time. The system may include a correlation module 435 to correlate streaming data with other data that may or may not be streaming data. The system may include a combination module 440 to combine the correlated data from the multiple data sources and republish the combined data to the streaming data marketplace for analysis, resale and so forth. The system may include a purchase module 445 to enable customers to subscribe to and purchase data from one or more publishers or resellers of data streams. The system may further include a page module 455 to provide pages for display to a client device, including analytics information, alerts, statistics, charts and so forth as may be available from the streaming data marketplace.

The system may further include a social graph module 450. The social graph module 450 may be configured to create and maintain a social graph between publishers or resellers of streaming data as well as between the publishers/resellers and customers. The social graph module may store relationships, such as how the data sources (identified by publisher or reseller) are related in a chain, mesh or other relationship to provide streaming data to a customer.

A social graph may be one example implementation for managing permissions to streaming data. For example, use of a social graph may enable limitations on who can consume or resell data from a streaming data publisher. The system may include a permissions module to manage permissions. For example, the permissions module may define permissions that enable other publishers/resellers/customers at nodes in the social graph separated by three degrees of separation or less to access and utilize the streaming data. Various licensing terms may be associated with permissions to restrict how the streaming data may be used, resold, etc. after being consumed by a publisher/reseller/customer with the appropriate permissions.

The system may include one or more data stores 415. The data store 415 may include or be configured to store any of a variety of useful types and formats of data. For example, the data store 415 may include a scripts data store 418 for storing scripts for analyzing, correlating or combining streaming data with other data as has been described. The data store 415 may also include a persistent data store 420 for storing persistent data that may be combined with streaming data. In one example, the persistent data store 420 may include data derived from streaming data. The data store 415 may further include an accounts data store 422 for storing customer or publisher profile or other account information, preferences, streaming data subscriptions and so forth. The data store 415 may include a results data store 424 for storing results of analytics performed on the streaming data. The data store 415 may further include a social graph data store 426 to store social graph relationships, connections and the like of the customers and publishers in the social graph. The data store 415 may also include a configuration data store 428 to store configuration data, such as, for example, permissions associated with a particular data stream, permissions held by customers and so forth. Other example configuration data may include state information of a data stream, tags in the stream, which chunk of the stream is going to be consumed and so forth.

The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

Services provided through the service provider environment may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

Computing services offered by a service provider environment, may include a computing device that executes as one or more servers or computing instances. A user may operate one or more servers to execute an operating system and computing applications as a service. A user may create, launch, and terminate servers as desired. The creator of the lab may have some control over the geographical location of servers or clusters of servers to optimize latency and provide high levels of redundancy.

The user may access and manage the one or more servers over a network 490 connection, such as a connection through the Internet, for example. The user may perform various operations on the servers such as adding, updating, modifying, deleting or other otherwise maintaining software on the servers. These operations may be performed by the user from the client device 470.

Server(s) or computing device(s) in the service provider environment 410 may be a computing instance as previously explained, and the virtual computing instance may be implemented using a service provider environment in a service provider environment, which may include a virtual distributed computing system with a virtualization layer executing on a hardware substrate layer. The hardware layer may include a plurality of physical computers, servers or processing nodes. The virtualization layer (e.g., hypervisor) may provide a platform on which virtual computing instances may be created. In other words, the virtual computing instances may execute on the hardware layer by using the platform provided by the virtualization layer. This computing service architecture that supports computing instances is illustrated in more detail later.

Client devices 470 may access data, content pages, services and so forth via the service provider environment 410, which may represent a computing instance or server in a computing service provider environment or one or more computing instances or clusters, over a network 490. Example client devices 470 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display 485 that may receive and present the message content.

The system may be implemented across one or more computing device(s) in the service provider environment 410 and including client devices 470 connected via a network 490. For example, a computing device 410 may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described.

The components executed on the computing device may include the modules described, as well as various other applications, services, processes, systems, engines or functionality not discussed in detail herein.

The client device shown in FIG. 4 may be representative of a plurality of client devices 470 that may be coupled to the network 490. The client device(s) 470 may communicate with the computing device over any appropriate network, including an intranet, the Internet, a cellular network, a local area network (LAN), a wide area network (WAN), a wireless data network or a similar network or combination of networks.

The client device 470 may include a display 485. The display 485 may comprise, for example, one or more devices such as cathode ray tubes (CRTs), liquid crystal display (LCD) screens, gas plasma based flat panel displays, LCD projectors, or other types of display devices, etc.

The client device 470 may be configured to execute various applications such as a browser 475, a respective page or content access application 480 for an electronic retail store and/or other applications. The browser 475 may be executed in a client device 470, for example, to access and render content pages, such as web pages or other network content served up by the computing device 410 and/or other servers. The content access application 480 may be executed to obtain and render for display content features from the server or computing device, or other services and/or local storage media.

In some implementations, the content access application 480 may correspond to code that is executed in the browser 475 or plug-ins to the browser 475. In other implementations, the content access application 480 may correspond to a standalone application, such as a mobile application. The client device may be configured to execute applications beyond those mentioned above, such as, for example, mobile applications, email applications, instant message applications and/or other applications. Customers at client devices 470 may access content features through content display devices or through content access applications 480 executed in the client devices 470.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware and with other types of computing resources.

Figure 5:
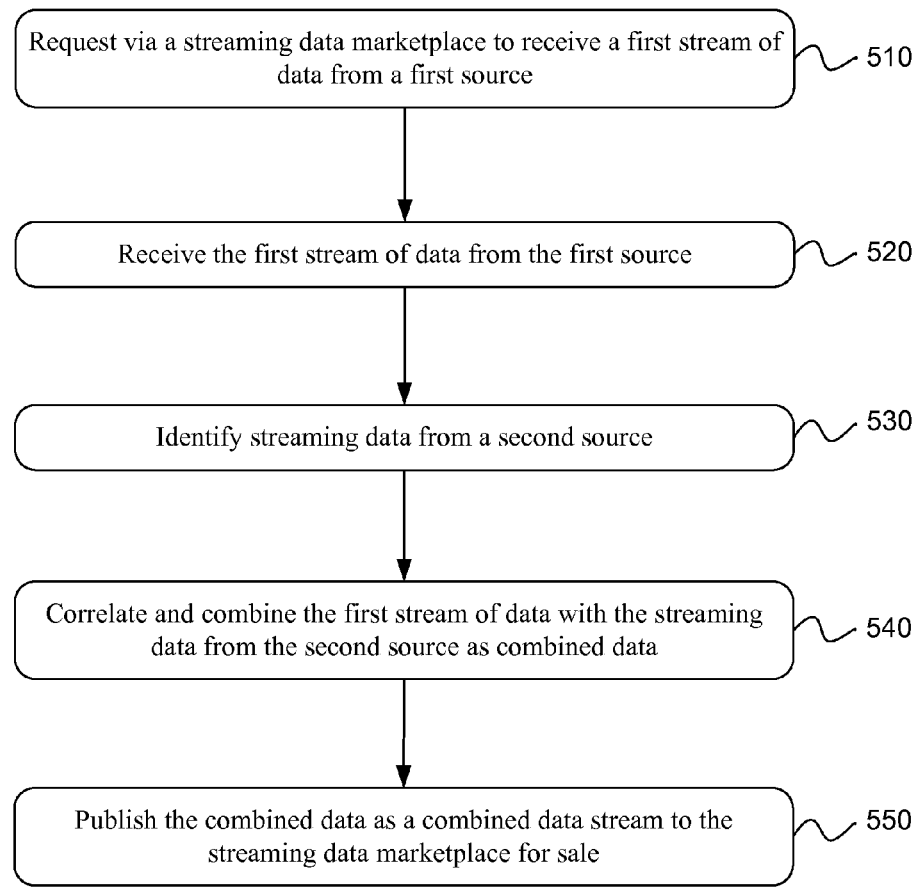
FIGS. 5-7 are flow diagrams for methods of organizing streaming data in a streaming data marketplace in accordance with examples of the present technology.
Figure 6:
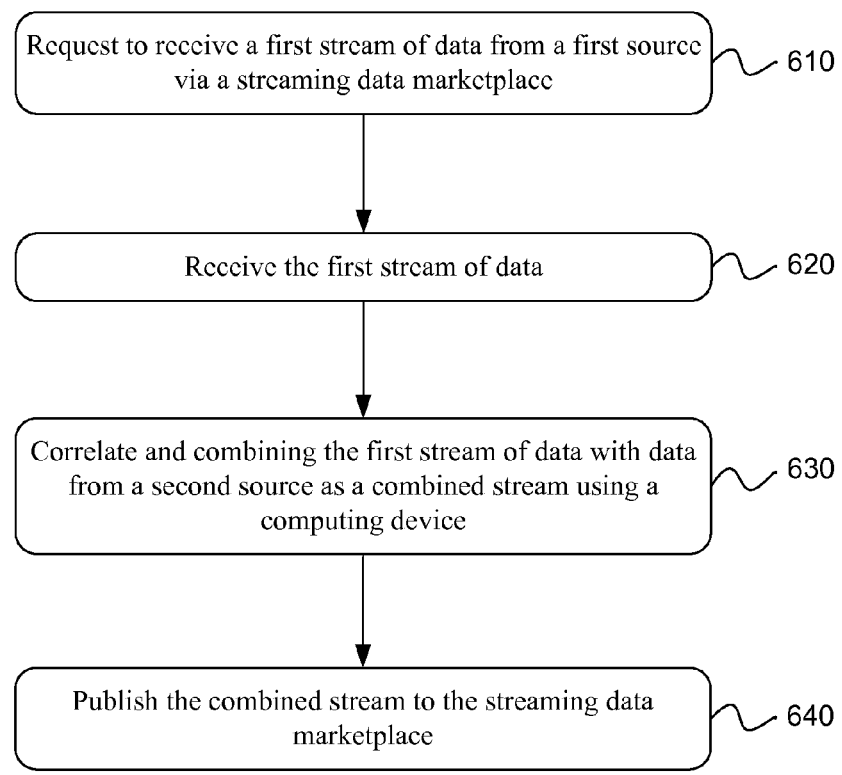
Figure 7:
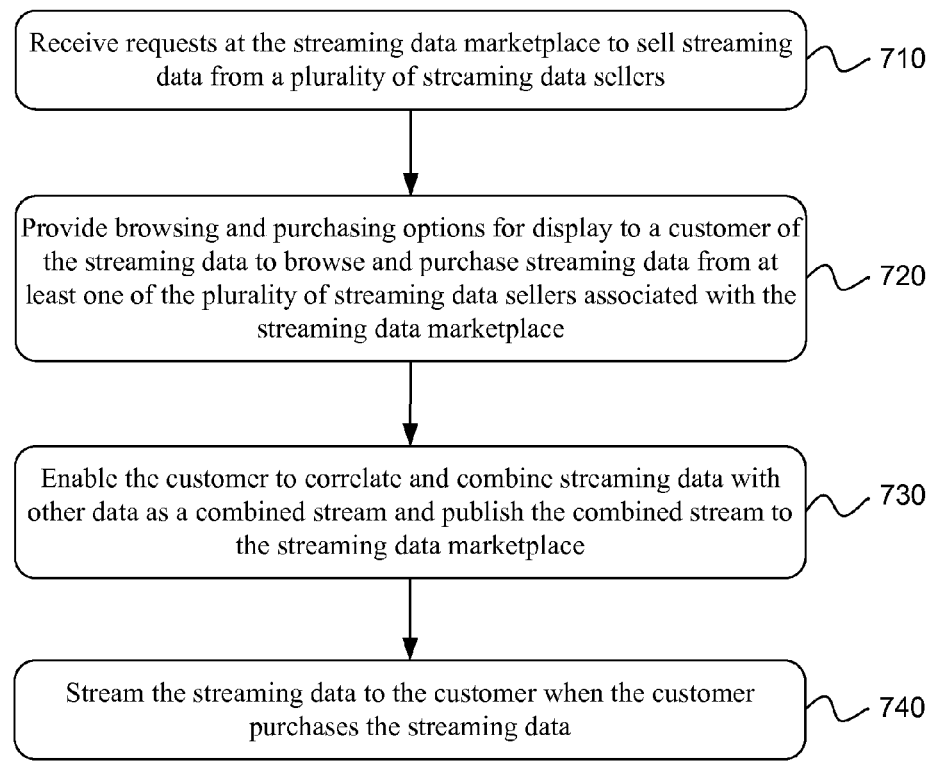

FIGS. 5-7 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

Referring now to FIG. 5, a flow diagram of a method for organizing streaming data or providing a streaming data marketplace is illustrated in accordance with an example of the present technology. The method may include being implemented on a computing device that is configured to facilitate organization of the streaming data. The computing device may include a processor, a memory in electronic communication with the processor, and instructions stored in the memory. The instructions may be executable by the processor to perform the method of FIG. 5.

The method may include requesting 510 via a streaming data marketplace to receive a first stream of data from a first source. The first stream of data may be received 520 from the first source. The method may include identifying 530 data from a second source. In some examples, the second source may be a streaming data source and the data from the second source may be streaming data. The method may include correlating 540 and combining the first stream of data with the data from the second source as combined data. The combined data may then be published 550 as a combined data stream to the streaming data marketplace for sale. The republication of the combined data may have low latency from the receipt of the first stream of data, such as having a delay of minutes, or less than a minute, or of several seconds, or of less than a second.

The method may further include receiving a third stream of data from a third source and combining the combined data stream with the third stream of data. Any number of sources may be combined together simultaneously or sequentially in any desired manner to produce an output data stream. The combination of data sources may be chain-like, with one source linking to another. The chain may include any number of branches and may form a hierarchical tree structure. Any number of chains may be present which may be independent of one another or may be linked together at one or more links in the chains.

The method may include maintaining a social graph including the first and second sources as nodes in the social graph. The method may also include managing permissions for accessing the first stream of data or the data from the second source or the combined data stream based on connections between the first and second sources in the social graph. In the context of a social graph, the sources may also be considered as the entity providing the data from the source. In one example, example, if there are additional nodes or data sources between the first and second sources (e.g., source 5 is between sources 2 and 4 in FIG. 3), the method may include determining a degree of separation of the first and second sources and comparing this against a permitted degree of separation defined by the first source. As another example of permissions, rather than being social graph-based, customers desiring accessing to the first stream of data may request access from the first source. The first source may grant permission in an automated manner or manually. When there is a chain of data sources between the first and second sources (e.g., sources 3 and 4 may be in a chain between sources 1 and 5 in FIG. 3, depending on the path between the sources), the second source may request permission from each of the data sources in the chain. In another example, the second source may simply request permission from the link in the chain from which the second source desires to receive and enhance the streaming data and may thus implicitly obtain permission from each of the other links in the chain.

One aspect of granting permission may involve setting and agreeing on a price for the data. Each combination of data may result in an increase in value of the streaming data. The increase per combination may be a set or fixed amount determined by the streaming data marketplace or may be a value that is fixed or variable and determined by the publisher of the combined data stream based on factors such as market value, demand, price demanded by upstream data publishers and so forth.

The price for data may be determined by quantity. For example, customers (who may also be publishers or resellers of combined data) may subscribe to a data stream and pay for a specified number of units of data, which units may be defined as a number of bits, bytes, kilobytes, megabytes, gigabytes, terabytes, petabytes, exabytes or the like. An alternative configuration may be to enable customers to pay for streaming data for a period of time, such as an hour, a week, a month, etc. It is noted, however, that this configuration may result in the customer paying for data that is not consumed and may thus be less preferable than enabling the customer to pay for an amount of data. As another alternative configuration, customers may pay for an amount of storage for the streaming data rather than for the amount of streaming data. Because the amount of storage may not match the amount of incoming data, this may also be less efficient for the customer and may thus be less preferable than enabling the customer to pay for an amount of data.

Customers may be enabled to pay for the amount of data based on a predefined amount of data or a measured amount of data. For example, a customer may determine and pay for an amount of data before beginning streaming. Once the amount has been reached, the receipt of the stream of data may terminate. As an example of paying for a measured amount of data, a customer may terminate streaming when desired and pay for the amount of data that was consumed from the time of initiating streaming to the time of termination, as may be monitored and measured by the streaming data marketplace.

As one example implementation, trade execution numbers from a financial exchange may be generated throughout the day. These numbers may be meaningful to an investment bank that made the trades identified by the numbers. For example, the investment bank may know who the customer is, who placed the trade, or other information. The investment bank may correlate this data with the data stream from the financial exchange and publish the combined stream. Other investment banks may then subscribe to the data. Each bank can correlate the data and add to the data to provide a complete picture of the trades during the day and who was involved. A hedge fund customer could subscribe at the bottom this chain and see a whole list of who traded with whom and run analytics on this data. This can create a social graph of participants that work together to correlate all of the data, where each participant is compensated for the supplied intellectual property.

As another example implementation, when wire payments are made, there may typically be limited visibility into what happens with the transaction between the endpoints of the transaction. Publication of streaming data for transactions at different financial institutions may enable correlation of related transactions to identify a path taken by the transaction between the endpoints.

Streaming data publishers may join themselves to a chain. Customers can choose from where in the chain the customer wants data. For example, the customer may desire physical or email addresses correlated to some identifier. The customer may add demographic information to the combination, but may not be interested in other value added services that may also be available.

One publisher may not wish to share data with a particular entity. The permissions of the present technology may enable publishers to ensure there is an agreement of relationship. The publisher that originates the data thus may retain some control over where the data goes, who has access to the data, how the data is used and so forth. The streaming data marketplace may enable publishers to ensure that other providers downstream have a contractual relationship. Permissions may be provided for establishing a relationship and/or on a per-transaction basis. Permissions may be based on a social graph or implemented using approval keys or another other suitable construct.

When data is republished as a combined data stream, the republished data includes the correlated data from previous publishers in the chain. Depending on the configuration, a customer may not necessarily see or be aware of each of the upstream data publishers. Alternatively, a portion or an entirety of publishers or data sellers in the upstream chain may be displayed or available for display to the customer. A data seller may be enabled to choose whether to show the upstream data publishers to the customer. In some examples, customers may find value in visibility of the data sources to ensure validity or accuracy of the data, such as when the data sources are known and trusted by the customer. In one example, each link in the chain may cryptographically sign the chain to make provable to the customer that the data is from the stated source and is not fraudulent.

As relating to permissions, one implementation may specify that the customer is to be within a predetermined number of degrees of separation from each link in the chain. The publishers or links in the chain may be provided for display to the customer for the customer to know which publishers to add as a node on social graph or from which publishers to request permission in order to consume the data.

Referring now to FIG. 6, a flow diagram of a method for organizing streaming data in a streaming data marketplace is illustrated in accordance with an example of the present technology. The method may include requesting 610 to receive and receiving 620 a first stream of data from a first source via a streaming data marketplace. The first stream of data may be correlated 630 and combined with data from a second source as a combined stream. The combined stream may then be published 640 to the streaming data marketplace for sale to and consumption by customers.

In one example, the first and second sources of data may be links in a chain of data sources that cumulatively build off one another through correlation and combination of the data. The first and second sources for the combined stream may optionally be provided to a customer of the combined stream for display. The customer may submit a request to the streaming data marketplace to consume a specified amount of data from the first data stream and may combine the second stream of data with the specified amount of data.

The method may include using cryptographic tokens, such as a public key/private key pair, to verify an authenticity of the first or second sources involved in the combined stream. In the public key/private key pair example, the public key may be used to decrypt at least some of the data. Inability to decrypt the data with the provided public key may thus be indicative of an inauthentic source. The use of cryptographic tokens may enable a customer to ensure the accuracy of stated sources in a chain of data sources. The method may include requesting permission on behalf of a customer and/or in response to a request received from a customer, from a single link in the chain to access the combined stream of data, or from multiple of the links in the chain to access the combined stream of data.

The method may include combining the first stream of data with the second stream of data from the second source as the combined stream using an independently managed computing instance. The computing instance may be managed by a customer or reseller of data. The computing instance may be independent of the streaming data marketplace.

FIG. 7 illustrates an example method for operating a streaming data marketplace in accordance with an example of the present technology. The method may include receiving 710 requests at the streaming data marketplace to sell streaming data from a plurality of streaming data sellers or publishers. Browsing and purchasing options may be provided 720 for display to a buyer or customer of the streaming data to browse and purchase streaming data from at least one of the plurality of streaming data sellers. The customer may be enabled 730 to purchase an amount of the streaming data independent of a time within which the amount of the streaming data is received. The amount of streaming data may then be streamed 740 to the customer when the customer purchases the streaming data.

The method may include providing a combination option for display to the customer to enable the customer to correlate and combine the streaming data with data from another data source, such as the customer's own data, another independent data source, a streaming data source from the streaming data marketplace, etc. The customer may further be enabled to sell the combined streaming data through the streaming data marketplace. The consumption, correlation, combination or other manipulation of data may be performed within the streaming data marketplace or may be fully or partially performed using a private or independent computing instance independent of the streaming data marketplace. The computing instance may optionally be within the service provider environment within which the streaming data marketplace is implemented.

The method may include supplying provider-controlled semi-ephemeral data storage to the customer for the streaming data streamed to enable the customer to sell the combined data stream through the streaming data marketplace. For example, the streaming data may be encrypted with a digital rights management certificate having an expiration date to expire the streaming data after a predetermined period of time or on a specified date. The service provider environment or the streaming data providers or both may control the lifetime of the streaming data, which may generally be ephemeral or non-permanent.

The method may include storing relationships between the data sellers of the streaming data. One example format in which the relationships are stored that has been described is a social graph. The social graph may enable coordination of publishers and customers to facilitate transactions regarding the streaming data, such as by tracking publication chains, managing relationships, managing permissions and so forth.

Similarly as mentioned in the description of the method illustrated in FIG. 5, additional example details, operations, options, variations, etc. that may be part of the methods illustrated in FIGS. 6-7 have been described previously herein and/or are described in further detail below. Various systems, devices, components, modules and so forth for implementing the method may also be used, as described with respect to the various examples included in this disclosure.

Figure 8:
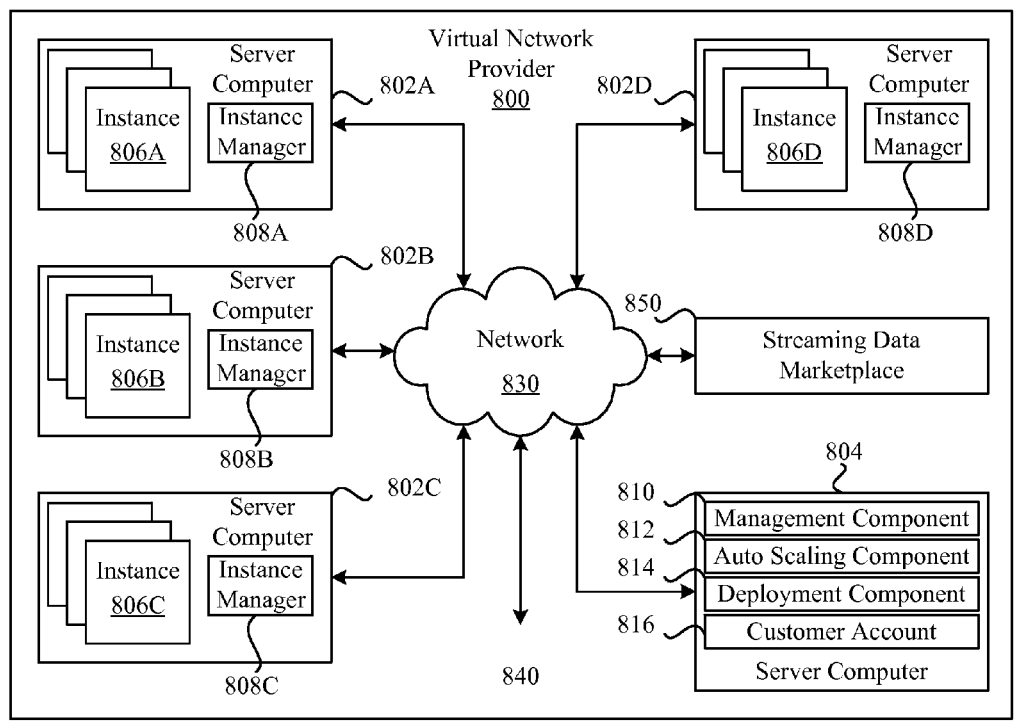
FIG. 8 is a schematic overview of a virtual computing resource provider in accordance with an example of the present technology

FIG. 8 illustrates how components of a data center may function as a computing service 800 in a service provider environment. As discussed earlier, the computing service 800 (i.e., the cloud provider or service provider) may be capable of delivery of computing and storage capacity as a service to a community of end recipients. In an example implementation, the computing service may be established for an organization by or on behalf of the organization. That is, the computing service 800 may offer a "private cloud environment." In another implementation, the computing service 800 may support a multi-tenant environment, wherein a plurality of customers operate independently (i.e., a public cloud environment). Generally speaking, the computing service 800 can provide the following models: Infrastructure as a Service ("IaaS"), Platform as a Service ("PaaS"), and/or Software as a Service ("SaaS"). Other models may also be provided. In some implementations, end users access the computing service 800 using networked client devices, such as desktop computers, laptops, tablets, smartphones, etc. running web browsers or other lightweight client applications. Those skilled in the art will recognize that the computing service 800 can be described as a "cloud" environment.

The particularly illustrated computing service 800 may include a plurality of server computers 802A-802D. While four server computers are shown, any number may be used, and large centers may include thousands of server computers. The server computers 802A-802D may provide computing resources for executing software instances 806A-806D. In one implementation, the instances 806A-806D may be virtual machines. A virtual machine may be an instance of a software implementation of a machine (i.e. a computer) that executes applications like a physical machine. In the example of virtual machine, each of the servers 802A-802D may be configured to execute an instance manager 808 capable of executing the instances. The instance manager 808 may be a hypervisor or another type of program configured to enable the execution of multiple instances 806 on a single server. Additionally, each of the instances 806 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 804 may be reserved for executing software components for managing the operation of the server computers 802 and the instances 806. For example, the server computer 804 may execute a management component 810. A customer may access the management component 810 to configure various aspects of the operation of the instances 806 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 812 may scale the instances 806 based upon rules defined by the customer. In one implementation, the auto scaling component 812 allows a customer to specify scale-up policies for use in determining when new instances should be instantiated and scale-down policies for use in determining when existing instances should be terminated. The auto scaling component 812 may consist of a number of subcomponents executing on different server computers 802 or other computing devices. The auto scaling component 812 may monitor available computing resources over an internal management network and modify resources available based on predictions of need as well as based on actual need.

A deployment component 814 may be used to assist customers in the deployment of new instances 806 of computing resources. The deployment component 814 may have access to account information associated with the instances, such as who is the owner of the account, credit card information, country of the owner, etc. The deployment component 814 may receive a configuration from a customer that includes data describing how new instances 806 should be configured. For example, the configuration may specify one or more applications to be installed in new instances 806, provide scripts and/or other types of code to be executed for configuring new instances 806, provide cache logic specifying how an application cache should be prepared, and other types of information. The deployment component 814 may utilize the customer-provided configuration and cache logic to configure, prime, and launch new instances 806. The configuration, cache logic, and other information may be specified by a customer using the management component 810 or by providing this information directly to the deployment component 814.

Customer account information 816 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a customer to the service provider environment.

A network 830 may be utilized to interconnect the server computers 802A-802D and the server computer 804. The network 830 may be a local area network (LAN) and may be connected to a Wide Area Network (WAN) 840 so that end users may access the computing service 800. It should be appreciated that the network topology illustrated in FIG. 8 has been simplified and that many more networks and networking devices may be utilized to interconnect the various computing systems disclosed herein.

The computing service 800 or service provider environment may include a streaming data marketplace service 850 to allow streaming data providers to publish and sell streaming data to customers. Customers may be able to browse the marketplace and select desired streaming data for consumption and then purchase the streaming data. The customers may consume the data, modify the data, combine the data with other data and so forth either using resources within or available from the streaming data marketplace or using independently managed resources, such as a personal compute instance linked to the streaming data marketplace.

Figure 9:
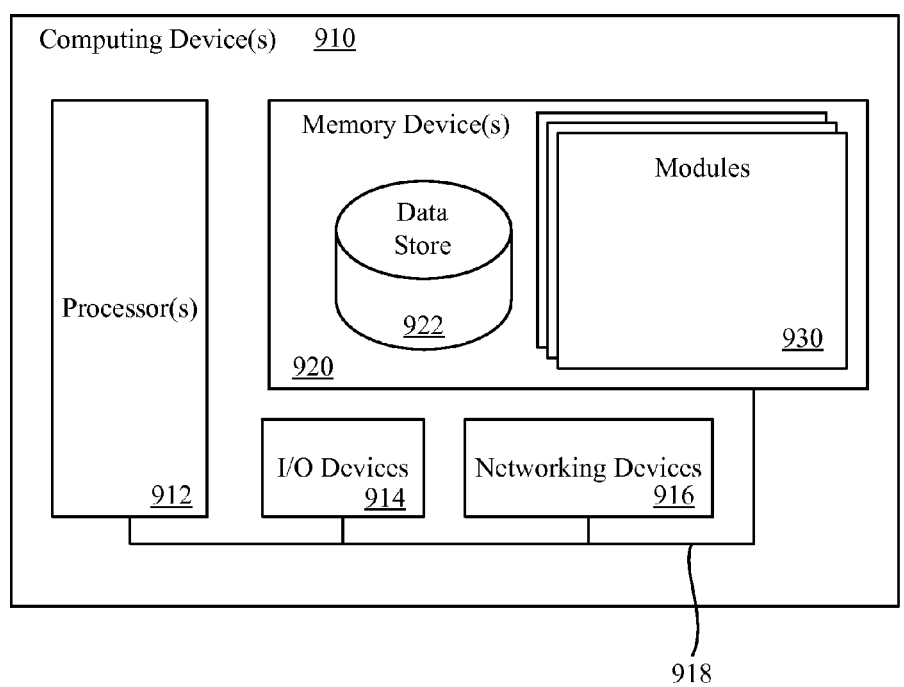
FIG. 9 is a block diagram of a computing system for providing a streaming data marketplace in accordance with an example of the present technology.

FIG. 9 illustrates a computing device 910 on which services or modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 930 that are executable by the processor(s) and data for the modules. A data store 922 may also be located in the memory device 920 for storing data related to the modules and other applications along with an operating system that is executable by the processor(s) 912.

The computing device 910 may further include or be in communication with a client device, which may include a display device. The client device may be available for an administrator to use in interfacing with the computing device 910, such as to review operation of a virtual computing instance, make improvements to machine learning models and so forth.

Various applications may be stored in the memory device 920 and may be executable by the processor(s) 912. Components or modules discussed in this description that may be implemented in the form of software using high programming level languages that are compiled, interpreted or executed using a hybrid of the methods.

The computing device 910 may also have access to I/O (input/output) devices 914 that are usable by the computing devices. An example of an I/O device 914 is a display screen that is available to display output from the computing devices. Other known I/O device may be used with the computing device as desired. Networking devices 916 and similar communication devices may be included in the computing device 910. The networking devices 916 may be wired or wireless networking devices 916 that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor 912. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media.

Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A computing device that is configured to facilitate organization of streaming data, comprising:
   a processor;
   a memory in electronic communication with the processor;
   instructions stored in the memory, the instructions being executable by the processor to:
      request via a streaming data service to receive a first stream of data from a first source;
      define an amount of data to be received from the first stream of data;
      receive the amount of data from the first stream of data via the streaming data service;
      identify streaming data from a second source via the streaming data service, wherein the streaming data from the second source is a different type of data than the data from the first stream of data from the first source;
      correlate and combine the first stream of data with the streaming data from the second source as combined data to increase utility of the first stream of data; and
      publish the combined data as a combined data stream to the streaming data service.

2. The device of claim 1, wherein the instructions are further executable by the processor to receive a third stream of data from a third source and combining the combined data stream with the third stream of data.

3. The device of claim 1, wherein the instructions are further executable by the processor to maintain a social graph including entities providing the data from the first and second sources as nodes in the social graph and manage permissions for accessing the first stream of data or the data from the second source or the combined data stream based on connections between the entities associated with the first and second sources in the social graph.

4. A computer-implemented method for organizing streaming data, comprising:
   requesting through a streaming data service to receive a first stream of data from a first source;
   requesting through the streaming data service to consume a specified amount of data from the first stream of data;
   receiving the specified amount of data from the first stream of data via the streaming data service;
   correlating and combining the first stream of data with data from a second source as a combined stream using a computing device to increase utility of the first stream of data, wherein the data from the second source is a different type of data than the first stream of data from the first source; and
   publishing the combined stream to the streaming data service.

5. The method of claim 4, wherein publishing comprises publishing the combined stream to a streaming data service for consumption by customers.

6. The method of claim 4, wherein the first and second sources of data are links in a chain of data sources that cumulatively build off one another through correlation and combination of the data.

7. The method of claim 4, further comprising displaying the first and second sources for the combined stream to a customer of the combined stream.

8. The method of claim 4, further comprising combining the second stream of data with the specified amount of data from the first stream of data.

9. The method of claim 4, further comprising using cryptographic tokens to validate an authenticity of the first or second sources from which the combined data stream is derived.

10. The method of claim 4, further comprising combining the first stream of data with the second stream of data from the second source as the combined stream using an independently managed computing instance, being managed independently of the streaming data service.

11. The method of claim 4, wherein the first and second sources are data sources representing links in a chain of data sources, the method further comprising requesting permission from a single link in the chain to access the combined stream of data.

12. The method of claim 4, wherein the first and second sources are data sources representing links in a chain of data sources, the method further comprising requesting permission from each link in the chain to access the combined stream of data.

13. A computer-implemented method for operating a streaming data service, comprising:
   receiving requests at the streaming data service to provide streaming data from a plurality of streaming data providers, the streaming data being available through the streaming data service;
   providing browsing and acquisition options for display to a customer of the streaming data to browse and acquire streaming data from at least one of the plurality of streaming data providers associated with the streaming data service, including an option to request to consume a specified amount of the streaming data;
   enabling the customer to correlate and combine the streaming data with other data as a combined stream and publish the combined stream to the streaming data service to increase utility of the stream of data, wherein the other data is a different type of data than the streaming data; and streaming the streaming data to the customer when the customer acquires the streaming data.

14. The method of claim 13, further comprising providing a user interface combination option for display to the customer to enable the customer to select to combine the streaming data with the other data as a combined data stream.

15. The method of claim 13, further comprising supplying provider-controlled semi-ephemeral data storage to the customer for the streaming data streamed through the streaming data service.

16. The method of claim 13, further comprising encrypting the streaming data with a digital rights management certificate having an expiration date to expire the streaming data after a predetermined period of time.

17. The method of claim 13, further comprising storing relationships and managing permissions between the data providers providing the streaming data.

18. The method of claim 13, further comprising coordinating publisher and customer relationships and permissions using a social graph.

19. The method of claim 13, further comprising enabling publishers or customers to consume, correlate, combine and republish data using a private computing instance independent of the streaming data service.

\* \* \* \* \*